US008115950B2

(12) United States Patent
Du et al.

(10) Patent No.: US 8,115,950 B2
(45) Date of Patent: Feb. 14, 2012

(54) IMAGE READING SYSTEM, INFORMATION PROCESSING APPARATUS, AND SCANNER, WITH SPECIFICATION OF NUMBER OF PAGES TO BE SCANNED AND CREATED INTO A FILE

(75) Inventors: Xiaojun Du, Kanagawa (JP); Osamu Suzuki, Kanagawa (JP); Eijiro Inoue, Kanagawa (JP); Akira Yokoyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1337 days.

(21) Appl. No.: 11/785,388

(22) Filed: Apr. 17, 2007

(65) Prior Publication Data
US 2008/0018952 A1   Jan. 24, 2008

(30) Foreign Application Priority Data

May 16, 2006   (JP) .................................. 2006-136769

(51) Int. Cl.
  *G06F 3/12*      (2006.01)
  *H04N 1/04*      (2006.01)
(52) U.S. Cl. ...................................... 358/1.15; 358/474
(58) Field of Classification Search .................. 358/1.5, 358/1.9, 1.13, 1.14, 1.15, 1.17, 1.18, 474, 358/400, 448, 454
See application file for complete search history.

(56) References Cited

U.S. PATENT DOCUMENTS

| | | | |
|---|---|---|---|
| 6,980,332 B2 * | 12/2005 | Simske | 358/445 |
| 2006/0062473 A1 * | 3/2006 | Moromizato et al. | 382/190 |
| 2006/0095433 A1 * | 5/2006 | Kano | 707/10 |

FOREIGN PATENT DOCUMENTS

| | | |
|---|---|---|
| JP | 8-7071 A | 1/1996 |
| JP | 9-200394 | 7/1997 |
| JP | 2000-349952 | 12/2000 |
| JP | 2003-60833 | 2/2003 |
| JP | 2004-27124 | 1/2004 |
| JP | 2004-158996 | 6/2004 |

* cited by examiner

*Primary Examiner* — Gabriel Garcia
(74) *Attorney, Agent, or Firm* — Dickstein Shapiro LLP

(57) ABSTRACT

An image reading system includes an information processing apparatus and a scanner connected to the information processing apparatus via a network. Upon receiving input of information that specifies the number of pages to be included in a file through an input unit and a web browser, the information processing apparatus transmits the information through a first communication unit to the scanner. The scanner reads image data through a reading unit, and divides the image data into files based on the information through a data management unit. The scanner transmits the files to the information processing apparatus through a second communication unit. The information processing apparatus displays images of the files on a monitor.

11 Claims, 6 Drawing Sheets

IMAGE READING SYSTEM, INFORMATION PROCESSING APPARATUS, AND SCANNER, WITH SPECIFICATION OF NUMBER OF PAGES TO BE SCANNED AND CREATED INTO A FILE

CROSS-REFERENCE TO RELATED APPLICATIONS

The present document incorporates by reference the entire contents of Japanese priority document, 2006-136769 filed in Japan on May 16, 2006.

BACKGROUND OF THE INVENTION

1. Field of the Invention

The present invention relates to an image reading system, an information processing apparatus, and a scanner.

2. Description of the Related Art

A scanner has already been known that performs scanning upon receipt of a command from a Web browser of a personal computer (PC). Such operation is referred to as web scan. For example, Japanese Patent Application Laid-open No. 2004-158996 discloses a technology enabling scanner reading through a PC.

In the conventional technology, a network scanner transmits image data read from a document to one or more terminals connected to a network. The network scanner can specify part of image data on a page basis and transmit only the specified part to a terminal. It is possible to select whether to transmit the rest part of image data or not to transmit but delete it based on a reply from a terminal. In addition, it is possible to specify processing before image data is deleted due to time limit of storage, thereby controlling a communication load even when transmitting and receiving of image data are repeated.

However, according to the conventional technology, there is no means to set reading conditions for the purpose of reading a plurality of pages of documents. When a plurality of pages of documents is automatically transferred, a read instruction can be only given through a web browser for each page. This is because the network scanner of the conventional technology sets the number of pages and processing of the rest data in advance to thereby control a communication load of image data.

SUMMARY OF THE INVENTION

It is an object of the present invention to at least partially solve the problems in the conventional technology.

According to an aspect of the present invention, an image reading system includes an information processing apparatus, and a scanner that is connected to the information processing apparatus via a network and performs scanning in response to a command from the information processing apparatus. The information processing apparatus includes a specifying unit that transmits to the scanner first information that specifies number of pages to be scanned and created into a file. The scanner includes a scanning unit that scans a plurality of pages to generate image data, and a data management unit that receives the first information, creates a file of the image data based on the first information, and transmits the file corresponding to the number of pages to the information processing apparatus.

According to another aspect of the present invention, an information processing apparatus is connected to a scanner via a network, and includes a specifying unit that transmits, to the scanner, information that specifies number of pages to be scanned and created into a file.

According to still another aspect of the present invention, a scanner is connected to an information processing apparatus via a network and performs scanning in response to a command from the information processing apparatus. The scanner includes a scanning unit that scans a plurality of pages to generate image data, and a data management unit that receives from the information processing apparatus information that specifies number of pages to be scanned and created into a file, creates a file of the image data based on the information, and transmits the file corresponding to the number of pages to the information processing apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to accompanying drawings.

In an image reading system according to a first embodiment of the present invention, the number of pages of document images included in a file of reading data that a scanner transmits is set on a PC side with regard to a plurality of pages of images read in the scanner, which are transmitted from the scanner. This configuration makes it possible to freely set a communication frequency and a size of a transmitted file and control a communication load.

Figure 1:
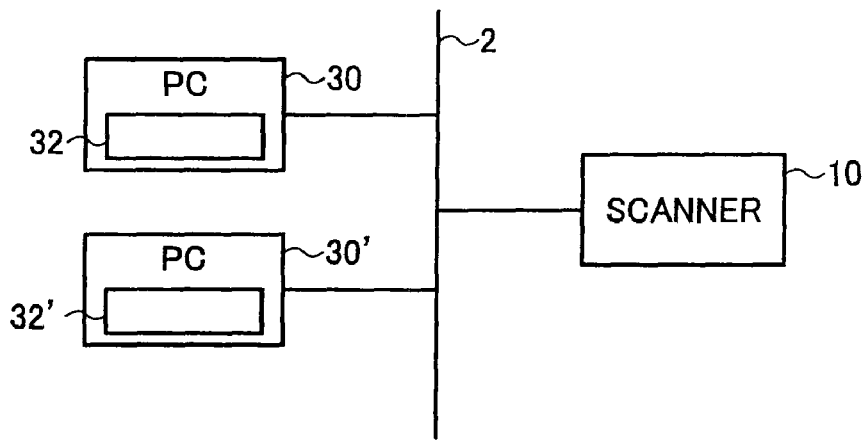
FIG. 1 is a schematic of an image reading system according to a first embodiment of the present invention.

FIG. 1 is a schematic of an image reading system according to a first embodiment of the present invention. A scanner 10 is connected to and communicates with PCs 30 and 30' (hereinafter, represented by the reference numeral 30) as an information processing apparatus through a network 2 such as a local area network (LAN).

Figure 2:
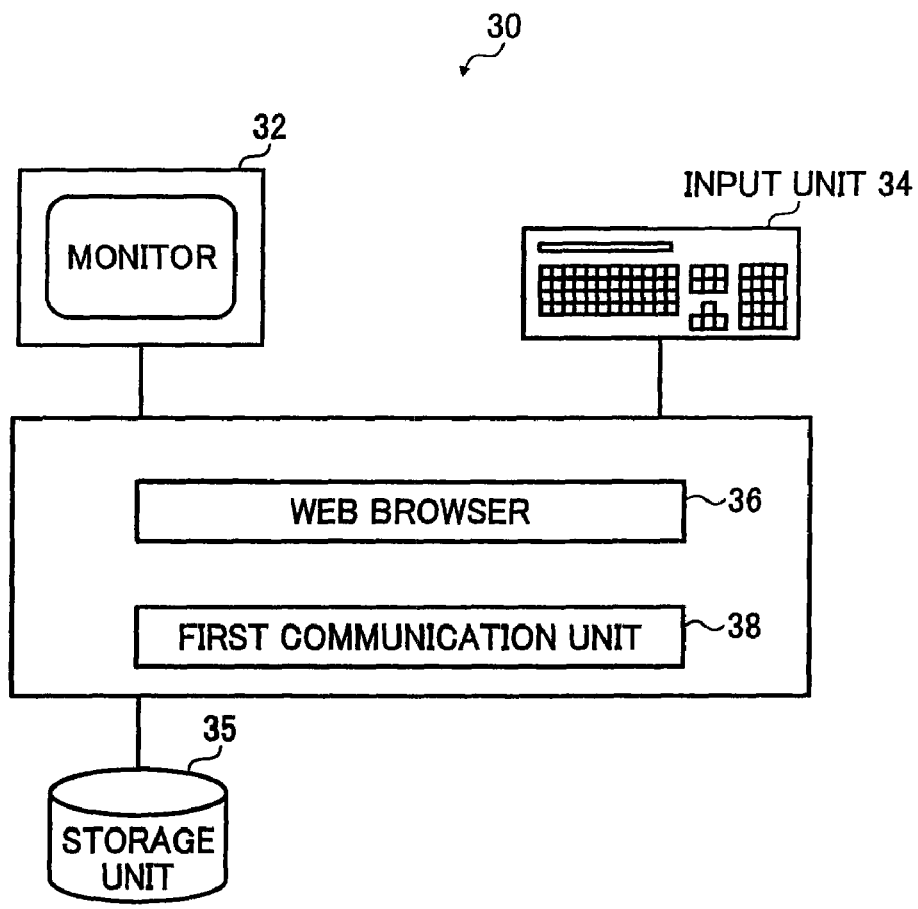
FIG. 2 is a functional block diagram of a PC shown in FIG. 1.

FIG. 2 is a functional block diagram of the PC 30. The PC 30 includes a monitor 32 as a display device (the reference numeral 32' in FIG. 1 denotes a monitor of the PC 30'), an input unit 34 that receives input from an operator, a storage unit 35 such as a hard disk device, a web browser 36, and a first communication unit 38. The web browser 36 interprets hypertext and converts screen display or input through a screen to hypertext in response to interpreted contents.

As setting that is input from a screen and that the web browser 36 starts up, there are an IP address of the scanner 10, the number of sheets of a document, designation of color or monochrome, reading accuracy, information to be transmitted based on the number of sheets of a document, and an IP address of the PC 30. The input screen information is stored in a server (not shown) designated by URL on the network 2. The input screen can be displayed on a screen by accessing the URL through the web browser 36 and downloading and input can be received through the input unit 34.

Image data of document images read by the scanner 10 is transmitted through the network 2 to the PC 30. The first communication unit of the PC 30 receives the read image data and the web browser 36 displays the image data on the monitor 32 as a web browser screen. A user of the image reading system inputs setting about reading (resolution, a size of an image to be read, and concentration) from the input unit 34 through the web browser screen.

Figure 3:
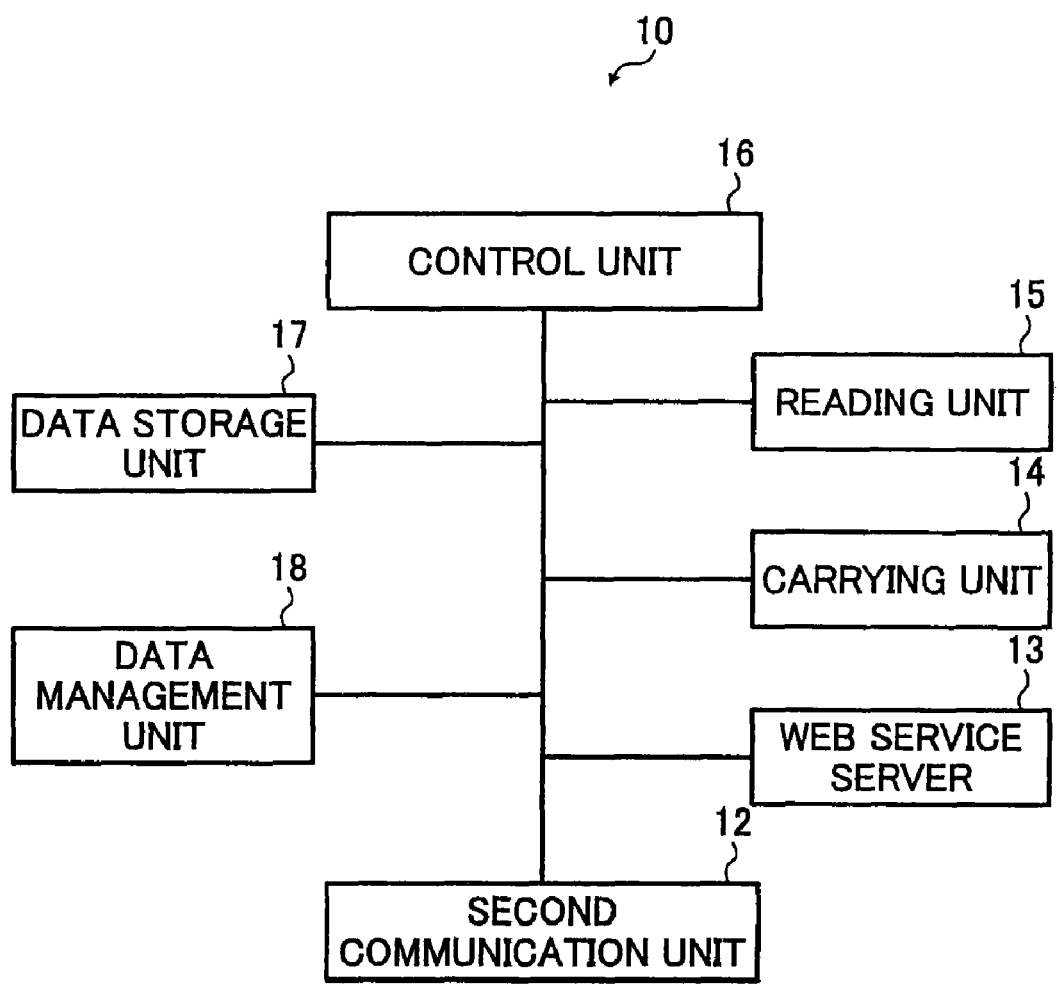
FIG. 3 is a functional block diagram of a scanner shown in FIG. 1.

FIG. 3 is a functional block diagram of the scanner 10. The scanner 10 includes a second communication unit 12, a web service server 13, a carrying unit 14, a reading unit 15, a control unit 16, a data storage unit 17, and a data management unit 18.

The second communication unit 12 transmits and receives data to and from the PC 30 through the network 2. The web service server 13 generates hypertext information of image data described in HTML, XML, and the like, transmits it to the PC 30 and receives various requests from the PC 30. The web service server 13 transmits processing instructions in response to the received various requests to the control unit 16 and the data management unit 18.

The carrying unit 14 carries or conveys a document placed on a document platform to the reading unit 15. The carrying unit 14 includes a document detection sensor (not shown), which detects whether a document is on the document platform. Thus, the carrying unit 14 can detect that a document is all carried.

The reading unit 15 includes charge coupled devices (CCD) and an optical system, reads a document carried from the carrying unit 14, and generates digital image data. Reading image data is performed based on setting such as resolution, a size of an image to be read, and concentration that are transmitted from the PC 30.

The control unit 16 receives an instruction from the web service server 13 and controls the reading unit 15 and the carrying unit 14.

The image data storage unit 17 includes a storage device such as a hard disk device and stores document data read from the reading unit 15.

The data management unit 18 receives an instruction from the web service server 13 and performs processing such as division, discard, file creation, and conversion of a format with respect to document data stored in the data storage unit 17.

Figure 4:
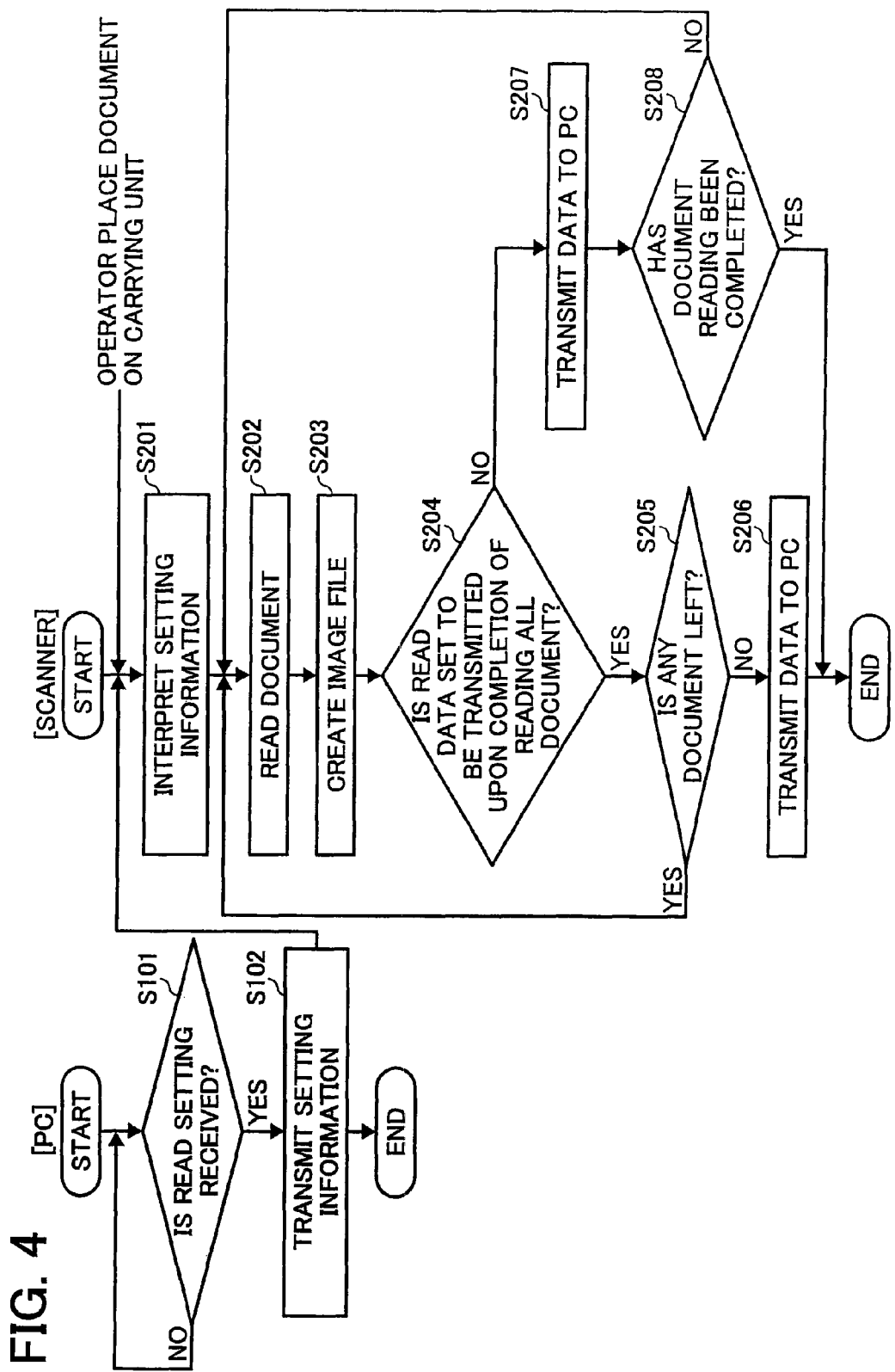
FIG. 4 is a flowchart of an image reading process according to the first embodiment.

FIG. 4 is a flowchart of an image reading process according to the first embodiment. A user of the image reading system places a document on the carrying unit 14 of the scanner 10. An operator of the PC 30 activates the web browser 36, starts up a screen to instruct reading, inputs read instructions such as resolution, a size of an image to be read, concentration, transmitting timing, and a file format, and sets a display method and a layout pattern on the web browser 36. The web browser 36 waits for input of image-read setting (step S101).

When receiving the setting (Yes at step S101), the web browser 36 converts the read instruction to hypertext. The first communication unit 38 transmits information set by the web browser 36 and displayed as hypertext through the network 2 to the scanner 10 (step S102).

The second communication unit 12 receives communication data that includes the read instruction and sends hypertext information that includes the read instruction to the web service server 13. The web service server 13 reads the hypertext information, interprets it according to the instruction, and sends the interpreted information to the control unit 16 (step S201).

The control unit 16 controls the reading unit 15 and the carrying unit 14, and reads a document. The data storage unit 17 stores the read document data (step S202).

The data management unit 18 creates an image file from one page of document data stored in the data storage unit 17 based on a designated format, and stores the image file in the data storage unit 17 (step S203).

The control unit 16 determines whether transmit timing of the read data is set at the time when all documents are read (step S204). When the read data is to be transmitted upon completion of reading all the documents (Yes at step S204), the carrying unit 14 determines whether any of the documents is left by the document detection sensor (step S205). If any (Yes at step S205), the process control returns to step S202.

When all the documents are read (No at step S205), the web service server 13 transmits a plurality of image files stored in the data storage unit 17 through the second communication unit 12 to the PC 30 (step S206).

On the other hand, when transmit timing of the read data is not set at the time when all documents are read (No at step S204), i.e., the read document images are transmitted one by one. The web service server 13 transmits one image file stored in the data storage unit 17 through the second communication unit 12 to the PC 30 (user PC and the like) (step S207). The carrying unit 14 determines whether all the documents on the carrying unit 14 are read (step S208). When all the documents have not yet been read (No at step S208), the process control returns to step S202, and operations of reading one sheet and transmitting it to the user PC 30 are likewise repeated.

Setting of reading all documents before transmission is explained above. However, it is possible to read only a predetermined number of sheets and transmit it whenever the predetermined number of sheets is read.

Thus, in the image reading system according to the first embodiment, the number of pages of document images included in a file of reading data transmitted from the scanner is set on a PC side with regard to a plurality of pages of images read in the scanner, which are transmitted from the scanner. This makes it possible to provide the image reading system in which communication frequency and a size of a transmitted file are freely set and a communication load is controlled.

Setting of consecutively reading a plurality of pages leads to the following comparison. For example, transmitting after the whole document is read is compared with transmitting whenever a sheet is read. The former enables a reduction in a communication load. However, when a transmission error occurs, a security level is low. The latter causes a large communication load. However, few lost file when a transmission error occurs leads to high security.

A plurality of pages of images to be read by the scanner through setting on a PC side can be created and transmitted as image data that is a group of the predetermined number of pages. This makes it possible to flexibly address a communication error.

Thus, it is possible to keep a balance, in the image reading system according to the first embodiment, between a communication load and security when a communication error occurs with regard to a relation between the PC that receives data and the scanner that transmits data.

According to a second embodiment of the present invention, an image reading system is capable of displaying image data transmitted from a scanner based on different layouts. It is possible to display not only a file as an image but also a plurality of files as an image.

Figure 5:
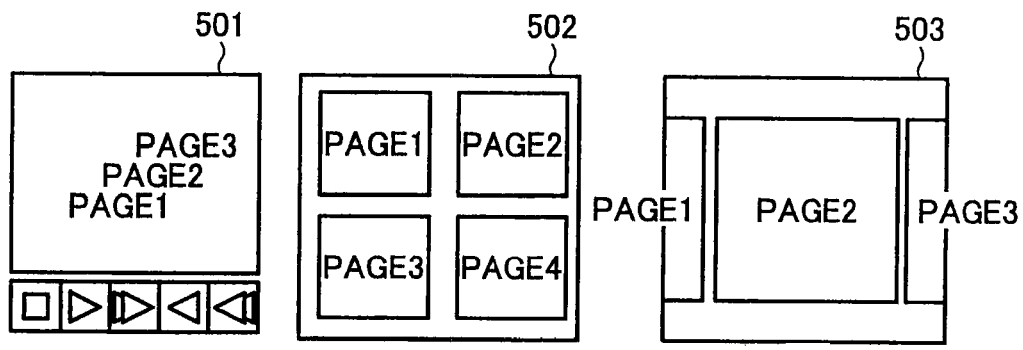
FIG. 5 shows an example of display of files received on a PC side in an image reading system according to a second embodiment of the present invention.

FIG. 5 shows an example of display of files received on a PC side in the image reading system according to the second embodiment. Display 501 shows a layout of displaying overlapped files 1 to 3 on a browser screen. When clicking a user interface (display 502) on a screen, it is possible to represent images to display files 2 and 3. The display 502 shows a layout of displaying a plurality of files on a browser screen. Display 503 also shows a layout of displaying a plurality of files on a browser screen. However, it is different from the display 502 in that only one of files 1 to 3 is enlarged and displayed and the other files are displayed in turn by dragging.

Figure 6:
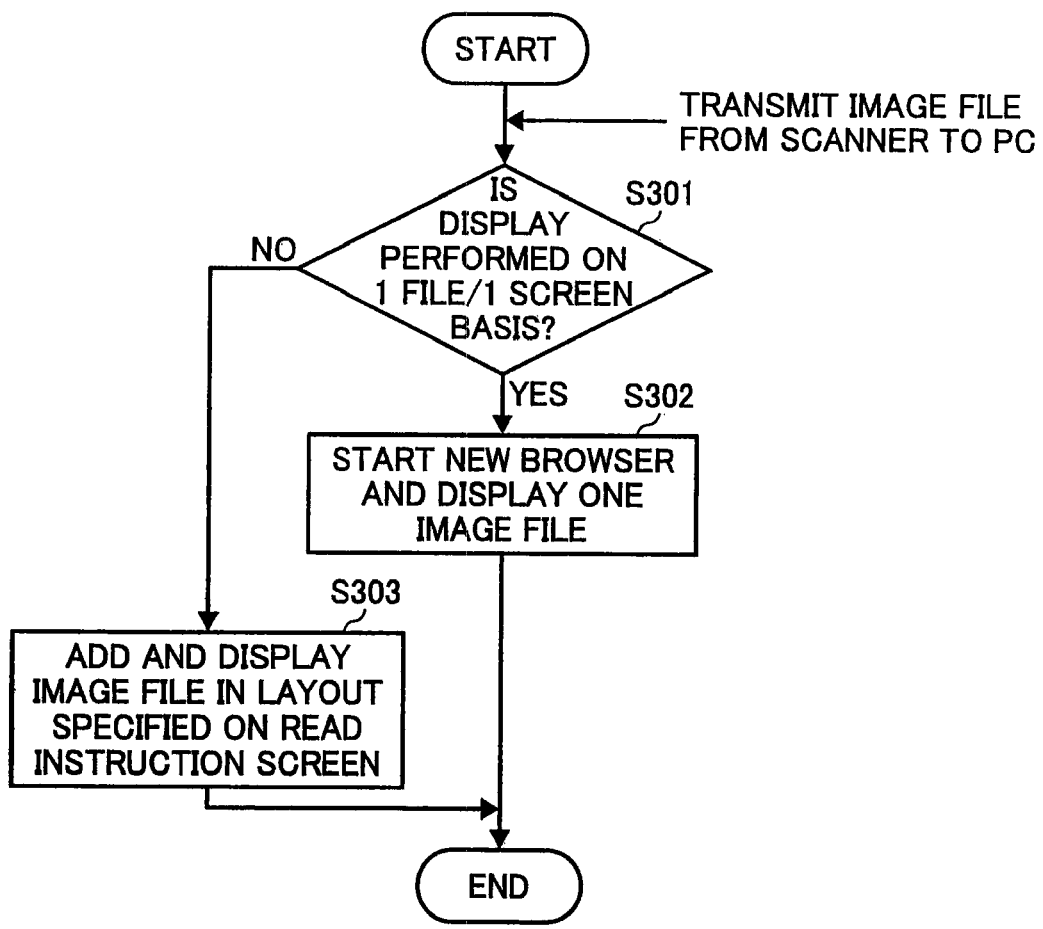
FIG. 6 is a flowchart of an image reading process according to the second embodiment.

FIG. 6 is a flowchart of an image reading process according to the second embodiment. An image file is transmitted from the scanner 10 to the PC 30 and the PC 30 receives the image file at steps S206 or S207 in FIG. 4.

The web browser 36 determines whether a display mode on the web browser that is set at step S101 (Yes) is 1 file/1 screen (step S301). When the display mode is set to 1 file/1 screen (Yes at step S301), the web browser 36 starts up a new browser and displays an image file on the new browser (step S302).

On the other hand, when the display mode is not set to 1 file/1 screen (No at step S301), the web browser 36 displays an image file on a browser screen of the monitor 32 based on a layout pattern that has been already set (step S303).

As a result, the image reading system according to the second embodiment makes it possible to display image data transmitted from the scanner based on different layouts and provide a detailed display of a file when an operator wants to see only a file in detail on a screen or a panoramic display of a file or when an operator wants a panoramic view of a plurality of files on a screen.

The image reading system according to a third embodiment of the present invention is different from that in the first embodiment in that the number of pages included in a file transmitted from the scanner through setting on the PC side is set, the scanner transmits a file that includes the predetermined number of pages, and a file that the PC receives is stored in a file name and a place that the browser has already set.

The number of pages included in a file and a place to store a file that includes that number of pages are set on the PC side based on the configuration. Therefore, it is possible to automatically store a file and a place to store it without setting them later.

Figure 7:
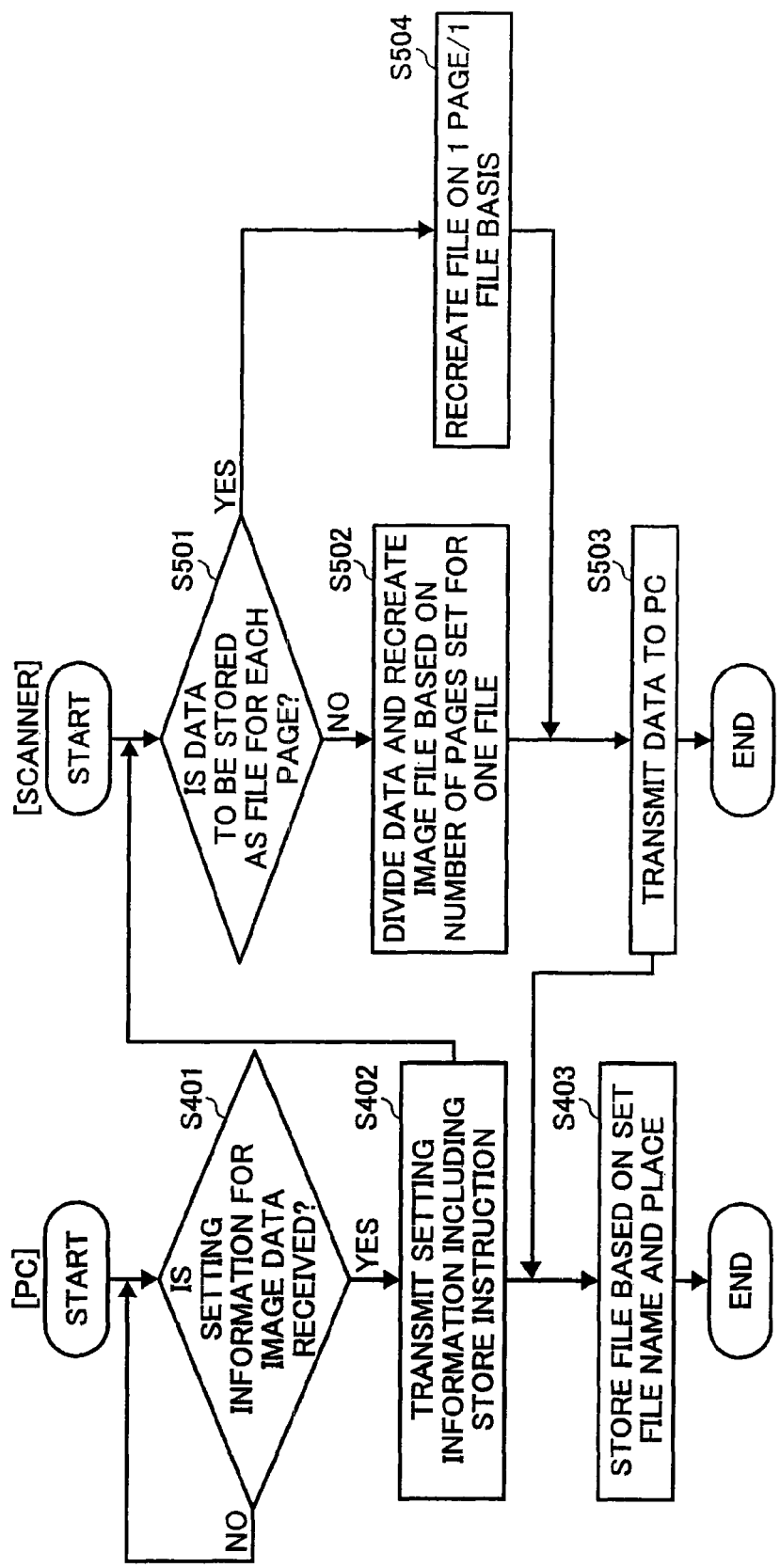
FIG. 7 is a flowchart of an image reading process according to a third embodiment of the present invention.

FIG. 7 is a flowchart of an image reading process according to the third embodiment. On the PC 30 side, a user of the image reading system inputs setting information that includes a store instruction of a file on a screen to instruct reading on the started web browser. The setting information indicates whether data is to be stored in the scanner 10 page by page, whether data is to be stored in a file of predetermined pages, a format style, a file name, or a place to store data after receiving it through the PC 30.

It is determined whether the web browser 36 receives the setting information (step S401). When receiving the setting information (Yes at step S401), the web browser 36 converts the setting information to hypertext. Then, the store instruction is also converted to hypertext. The first communication unit 38 transmits the setting information converted to hypertext through the network 2 to the scanner 10 (step S402).

The second communication unit 12 receives the setting information that is set by the web browser 36, and sends hypertext including the store instruction to the web service server 13. The web service server 13 interprets the store instruction in hypertext and sends the interpreted store instruction to the data management unit 18. The data management unit 18 determines whether the store instruction indicates that data is to be stored in a file page by page (step S501).

When the store instruction indicates that data is not to be stored in a file page by page (No at step S501), the data management unit 18 divides the document data stored in the data storage unit 17 at steps S202 and S203 in FIG. 4, and creates an image file again from a predetermined number of pages of document data based on the store instruction. The data management unit 18 stores one created image file in the data storage unit 17 (step S502). The second communication unit 12 transmits the one image file stored in the data storage unit 17 to the PC 30 (step S503).

On the other hand, when the data management unit 18 determines that a storage method in store instruction is to store in a file page by page (Yes at step S501), the data management unit 18 creates a file again from document data stored in the data storage unit 17 at steps S202 and S203 in FIG. 4 page by page, and stores it in the data storage unit 17 (step S504). The web service server 13 transmits the image file of 1 page/1 image, in this case, stored in the data storage unit 17 through the second communication unit 12 to the PC 30 (step S503).

The first communication unit 38 of the PC 30 receives the transmitted image file page by page and stores the received image file in a site that the file corresponds to in the storage unit 35 of the PC 30 based on a file name and a place to store that have been already designated at step S401 (step S403).

Thus, in the image reading system according to the third embodiment, the number of pages included in a file and a place to store a file that includes that number of pages are set on the PC side. Therefore, it is possible to automatically store a file and a place to store without setting them later.

Figure 8:
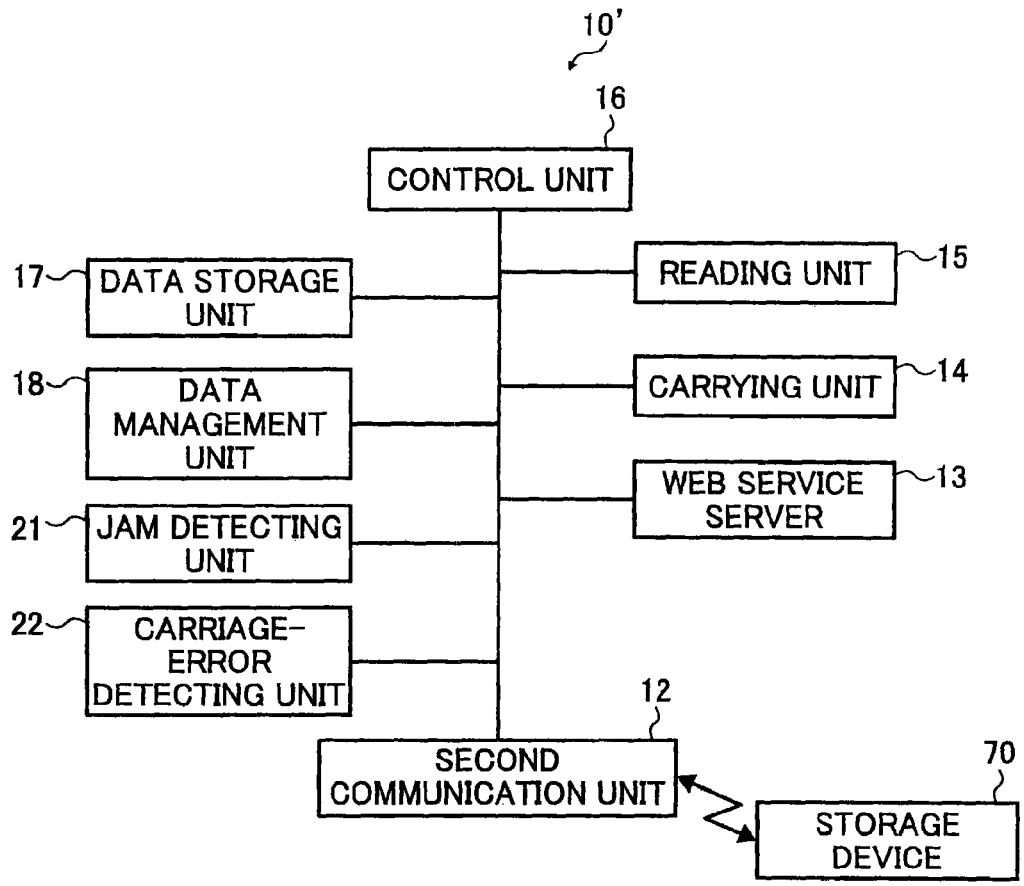
FIG. 8 is a functional block diagram of a scanner according to a modified embodiment.

FIG. 8 is a functional block diagram of the scanner 10' according to a modified embodiment. It is possible to perform some modified examples in the image reading system according to the first embodiment.

The scanner 10' additionally includes a jam detecting unit 21 that detects a paper jam that occurs in the carrying unit 14 and transmits paper jam detecting information to the PC 30. It is desirable that the PC 30 displays an error when the monitor 32 receives paper jam detecting information. This is because it is possible to display on the PC side that a paper jam occurs even apart from the scanner 10'.

When the PC 30 receives paper jam detecting information, it is desirable that the web browser 36 receives either instruction information of discarding document data read until a paper jam occurs or instruction information of transmitting pages worth of the read document data based on paper jam detecting information and the first communication unit 38 transmits the received information to the scanner 10'.

Desirably the data management unit 18 of the scanner 10' receives the instruction information, discards the read document data or transmits pages worth of the read document data based on received instruction information. This leads to the efficient image reading system without wasting read data until an error occurs.

It is desirable that when the carrying unit 14 cannot automatically carry a plurality of pages of a document, the scanner 10' includes a carriage-error detecting unit 22 that transmits carriage error information to the PC 30 and when the monitor 32 receives carriage error information, the PC 30 displays the error. This is because carriage error occurrence in the scanner 10' can be displayed on the PC side.

When the number of pages of a document whose reading is set by the web browser 36 is different from the number of pages of received document images, the web browser 36 desirably displays a reading error on the monitor 32. Error occurrence can be displayed by comparing read setting with the actual number of received pages.

It is desirable to include a large-capacity storage device 70 that is connected to the scanner 10' through a network and stores document data read by the reading unit 15 such as a hard disk drive. This storage device allows storing the read image data to secure backup data.

Figure 9:
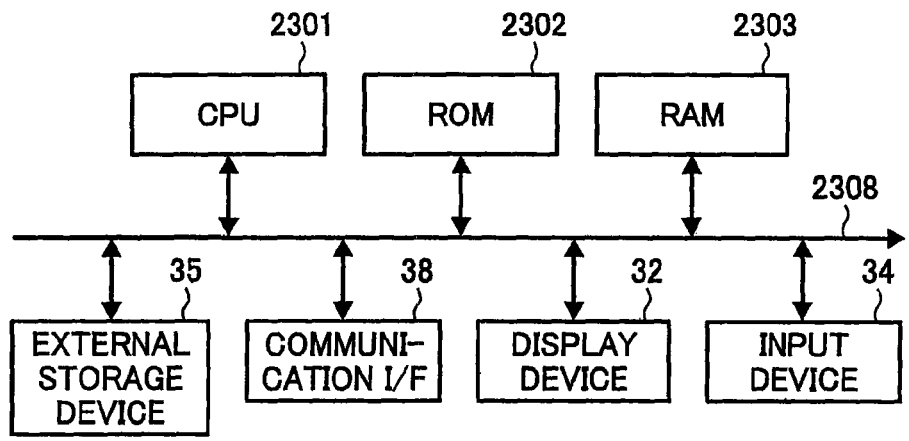
FIG. 9 is a schematic of hardware configuration of an information processing apparatus according to the embodiments.

FIG. 9 is a schematic of hardware configuration of an information processing apparatus according to the embodiments. The information processing apparatus according to the embodiments includes, as shown in FIG. 9, a central processing unit (CPU) 2301, a read only memory (ROM) 2302, a random access memory (RAM) 2303, an external storage device 35 (storage unit) such as a hard disk drive (HDD) and a compact disk (CD) drive device, an input device (input unit) 34, a display device (monitor) 32, a communication interface (I/F) (first communication unit) 38, which are connected through a bus 2308. The information processing apparatus has a hardware configuration that uses an ordinary PC.

A computer program (hereinafter, "image reading program") executed by the information processing apparatus is stored in a recording medium that can be read by the PC such as a compact disk-read only memory (CD-ROM), a flexible disk (FD), a compact disk-recordable (CD-R), and a digital versatile disk (DVD) in an installable or executable file format.

The image reading program can be stored in a PC that is connected to a network such as the Internet and downloaded via the network. In addition, the image reading program can be provided or distributed via a network such as the Internet. The image reading program can also be stored in advance in a ROM and provided.

The image reading program includes modules that implement the units described above (the first communication unit, the web browser, and the like). As actual hardware, the CPU (processor) loads the image reading program from the storage medium into a main storage device and executes it to implement the first communication unit, the web browser, and the like on the main storage device.

The scanner 10 can also have a similar hardware configuration including the reading unit 15, the carrying unit 14, and the like. That is, the second communication unit 12, the web service server 13, the carrying unit 14, the reading unit 15, the control unit 16, the data storage unit 17, and the data management unit 18 can be implemented on the main storage device in the same manner as described above or can be constituted of circuits.

As set forth hereinabove, according to an embodiment of the present invention, an information processing apparatus transmits, to a reading device, information that specifies the number of pages to be read and created into a file. Upon receiving the information, the reading device reads image data, and creates a file of image data corresponding to the number of pages. The reading device transmits the file to the information processing apparatus. Thus, in an image reading system, a file of a specified number of pages can be transmitted from the reading device to the information processing apparatus, and communication efficiency can be improved. Even when an error occurs in the reading device, the reading device can read only image data that has not yet read at occurrence of the error. As a result, it is possible to eliminate wasteful reading and communication operations.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading system comprising:
   an information processing apparatus; and
   a scanner that is connected to the information processing apparatus via a network and performs scanning in response to a command from the information processing apparatus, wherein
   the information processing apparatus includes a specifying unit that transmits to the scanner first information that specifies number of pages to be scanned and created into a file, and
   the scanner includes
      a scanning unit that scans a plurality of pages to generate image data, and
      a data management unit that receives the first information, creates a file of the image data based on the first information, and transmits the file corresponding to the number of pages to the information processing apparatus.

2. The image reading system according to claim 1, wherein
   the specifying unit transmits to the scanner second information that specifies number of pages such that the file is to be transmitted to the information processing apparatus after specified number of pages are scanned, and
   the data management unit transmits the file to the information processing apparatus based on the second information.

3. The image reading system according to claim 1, wherein the information processing apparatus further includes a display unit that displays, on a screen, images of pages included in the file received from the scanner.

4. The image reading system according to claim 1, wherein the information processing apparatus further includes a storage unit that stores therein the file.

5. The image reading system according to claim 3, wherein
   the information processing apparatus further includes a browser unit that displays a web browser on the display unit, and
   the specifying unit receives through the browser unit input of the first information and second information that specifies number of pages such that the file is to be transmitted to the information processing apparatus after specified number of pages are scanned.

6. The image reading system according to claim 1, wherein the scanner further includes a conveyor unit that automatically conveys pages.

7. The image reading system according to claim 6, wherein
   the scanner further includes a detecting unit that detects a paper jam that occurs in the conveyor unit, and transmits paper-jam information to the information processing apparatus, and
   the information processing apparatus further includes a display unit that displays an error notification when the information processing apparatus receives the paper-jam information.

8. The image reading system according to claim 7, the information processing apparatus further includes an instructing unit that transmits to the scanner any one of a command to discard image data of pages that have been scanned until occurrence of the paper jam and a command to transmit image data of pages that have been scanned until occurrence of the paper jam based on the paper-jam information.

9. The image reading system according to claim 6, wherein the scanner further includes a detecting unit that detects that the conveyor unit is disabled for automatic conveyance of a plurality of pages, and transmits error information to the information processing apparatus, and the information processing apparatus further includes a display unit that displays an error notification when the information processing apparatus receives the error information.

10. The image reading system according to claim 3, wherein, when the number of pages to be scanned specified by the first information is different from number of pages included in the file, the display unit displays a scanning error.

11. The image reading system according to claim 1, further comprising a storage device that is connected to the scanner via the network and stores therein the image data obtained by the scanning unit.

* * * * *